United States Patent
Kudo (10) Patent No.: US 8,817,059 B2
(45) Date of Patent: Aug. 26, 2014

(54) OPTICAL SCANNING APPARATUS AND IMAGE FORMING APPARATUS HAVING A MULTI-BEAM LIGHT SOURCE WITH A CONTROLLER FOR CONTROLLING THE MULTI-BEAM LIGHT SOURCE

(71) Applicant: Canon Kabushiki Kaisha, Tokyo (JP)

(72) Inventor: Genichiro Kudo, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/758,130

(22) Filed: Feb. 4, 2013

(65) Prior Publication Data

US 2013/0201270 A1    Aug. 8, 2013

(30) Foreign Application Priority Data

Feb. 6, 2012    (JP) ................. 2012-023039

(51) Int. Cl.
    *B41J 2/435*    (2006.01)
    *B41J 2/47*     (2006.01)

(52) U.S. Cl.
    USPC .......................................... 347/235; 347/250

(58) Field of Classification Search
    USPC ................. 347/236, 243, 250, 259–261, 235
    See application file for complete search history.

(56) References Cited

U.S. PATENT DOCUMENTS

| | | | | |
|---|---|---|---|---|
| 7,355,770 B2* | 4/2008 | Miyatake et al. | .......... | 359/204.1 |
| 7,626,744 B2* | 12/2009 | Arai et al. | .................. | 359/204.1 |
| 8,228,580 B2* | 7/2012 | Arai et al. | .................. | 359/204.1 |
| 2008/0225105 A1* | 9/2008 | Kudo | ............................ | 347/235 |
| 2009/0167837 A1 | 7/2009 | Ishida et al. | | |

FOREIGN PATENT DOCUMENTS

| | | | |
|---|---|---|---|
| JP | 2003279873 A | 10/2003 |
| JP | 2004271691 A | 9/2004 |
| JP | 2006251403 A | 9/2006 |
| JP | 2007079291 A | 3/2007 |
| JP | 2008225060 A | 9/2008 |
| JP | 2009023160 A | 2/2009 |
| JP | 2009023162 A | 2/2009 |
| JP | 2009042487 A | 2/2009 |
| JP | 2009157014 A | 7/2009 |
| JP | 2010039416 A | 2/2010 |
| JP | 2011002499 A | 1/2011 |
| JP | 2011148142 A | 8/2011 |
| JP | 2012073558 A | 4/2012 |

* cited by examiner

*Primary Examiner* — Hai C Pham
(74) *Attorney, Agent, or Firm* — Rossi, Kimms & McDowell LLP

(57) ABSTRACT

An optical scanning apparatus, including: a deflector including deflection surfaces and configured to deflect, by the deflection surfaces, light beams respectively emitted from light emitting portions for scanning in a main scanning direction; an imaging optical system configured to guide the light beams deflected for scanning by the deflection surfaces to a surface to be scanned; a light source including the light emitting portions arranged so as to be separated from each other in a sub-scanning direction perpendicular to the main scanning direction and an optical axis direction of the imaging optical system; and a controller configured to control the light source in such a manner that a difference between scanning start timings of the light beams at two adjacent deflection surfaces among the deflection surfaces is different from a difference between scanning start timings of the light beams at other two adjacent deflection surfaces among the deflection surfaces.

15 Claims, 8 Drawing Sheets

OPTICAL SCANNING APPARATUS AND IMAGE FORMING APPARATUS HAVING A MULTI-BEAM LIGHT SOURCE WITH A CONTROLLER FOR CONTROLLING THE MULTI-BEAM LIGHT SOURCE

BACKGROUND OF THE INVENTION

1. Field of the Invention

The present invention relates to an optical scanning apparatus, and more particularly, to an optical scanning apparatus suitable for an image forming apparatus such as a laser beam printer, a digital copying machine or a multifunction printer, which employs an electrophotography process.

2. Description of the Related Art

A conventional multibeam optical scanning apparatus that forms spots of a plurality of light beams emitted from a light source (multibeam light source), which includes a plurality of light emitting portions (light emitting points), on a surface of a photosensitive drum (photosensitive member) serving as a surface to be scanned has been proposed in Japanese Patent Application Laid-Open No. 2008-225060. In such a multibeam optical scanning apparatus, a specific light beam (reference light beam) among a plurality of light beams is used for detecting a writing start position. For the other light beams that are not used for detecting the writing start position, times between reflection at a plurality of deflection surfaces (reflection surfaces) of a deflecting device and arrival at the surface to be scanned are measured. An arrival timing of each of the light beams is obtained based on a time when the reference light beam is detected, and a writing start timing of each of the light beams is determined based on an average value of the arrival timings with respect to all the deflection surfaces.

However, in the optical scanning apparatus described in Japanese Patent Application Laid-Open No. 2008-225060, the plurality of light emitting portions of the multibeam light source have different positions in the sub-scanning direction, thereby causing the following problem. That is, an image defect is generated due to different surface accuracy between the plurality of deflection surfaces of the deflecting device. Specifically, each of the deflection surfaces is supposed to be formed as an ideal planar surface (rectangle), but in practice, the deflection surface may be formed as a surface having a so-called distortion in which, for example, two vertices on a diagonal line among four vertices of the rectangle are slightly displaced in the same direction.

When the multibeam emitted from the plurality of light emitting portions enters the deflection surface having such a distortion, reflection angles of the beams at the deflection surface differ from each other depending on an incident position of each beam in the sub-scanning direction. This causes each spot irradiation position (scanning start position) of the multibeam on the surface to be scanned to be shifted from its original position in the main scanning direction. In the optical scanning apparatus described in Japanese Patent Application Laid-Open No. 2008-225060, the average value of the arrival timings with respect to each of the deflection surfaces is obtained, and hence there is no consideration on the problem of the distortion generated on each of the plurality of deflection surfaces.

In order to solve the above-mentioned problem, a method of using a deflecting device including a deflection surface having high surface accuracy can be conceived. However, such a deflecting device increases cost.

SUMMARY OF THE INVENTION

The present invention provides an optical scanning apparatus and an image forming apparatus that are capable of reducing, with a simple configuration, a shift of a scanning start position of a multibeam in a main scanning direction on a surface to be scanned and forming a high-resolution image even when using an inexpensive deflecting device.

In order to achieve the present invention, according to the an exemplary embodiment of the present invention, there is provided an optical scanning apparatus, including: a deflector including a plurality of deflection surfaces and configured to deflect, by the plurality of deflection surfaces, a plurality of light beams respectively emitted from a plurality of light emitting portions for scanning in a main scanning direction; an imaging optical system configured to guide the plurality of light beams deflected for scanning by the plurality of deflection surfaces to a surface to be scanned; a light source including the plurality of light emitting portions arranged so as to be separated from each other in a sub-scanning direction perpendicular to the main scanning direction and an optical axis direction of the imaging optical system; and a controller configured to control the light source in such a manner that a difference between scanning start timings of the plurality of light beams at two adjacent deflection surfaces among the plurality of deflection surfaces is different from a difference between scanning start timings of the plurality of light beams at other two adjacent deflection surfaces among the plurality of deflection surfaces.

Further features of the present invention will become apparent from the following description of exemplary embodiments with reference to the attached drawings.

DESCRIPTION OF THE EMBODIMENTS

In the following, exemplary embodiments of the present invention are described in detail with reference to the attached drawings.

First Embodiment

Image Forming Apparatus

Figure 8:
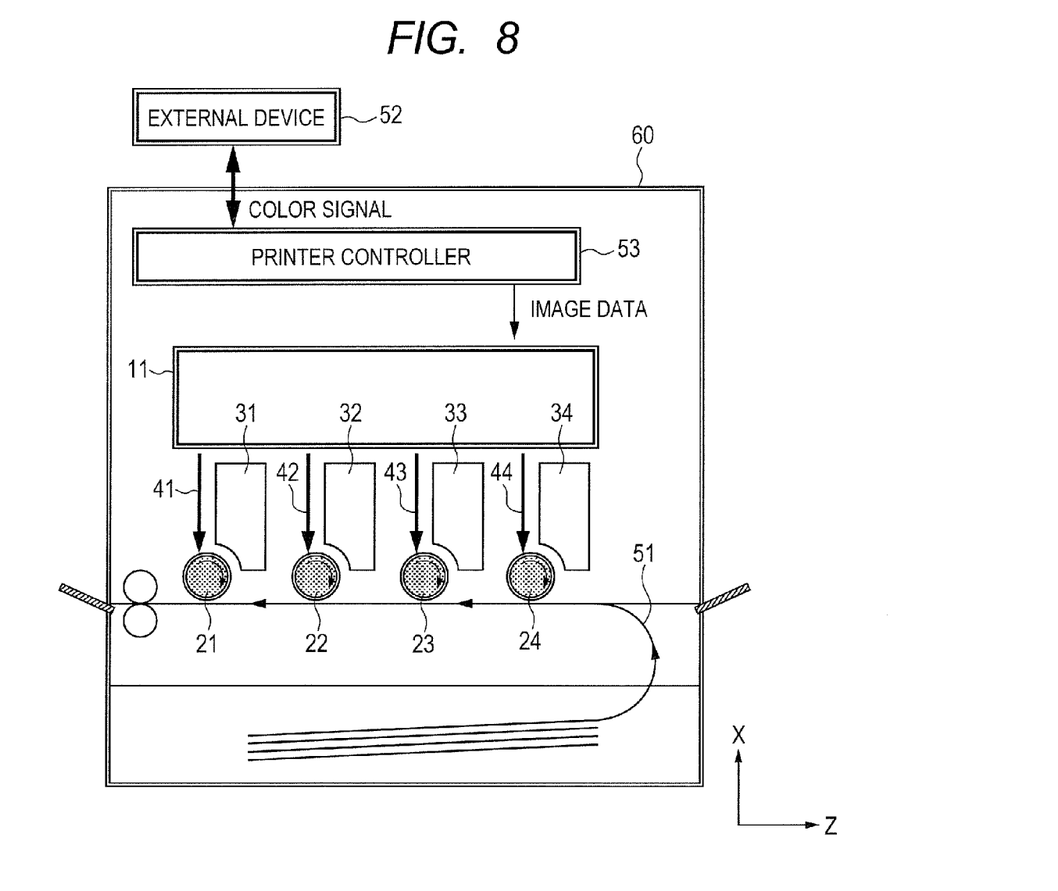
FIG. 8 is a schematic diagram illustrating main parts of a color image forming apparatus including an optical scanning apparatus according to an embodiment of the present invention.

FIG. 8 is a schematic diagram illustrating main parts in a ZX cross section (cross section in a sub-scanning direction) of an image forming apparatus including an optical scanning apparatus according to an embodiment of the present invention. In FIG. 8, the color image forming apparatus 60 includes an optical scanning apparatus 11, photosensitive drums (photosensitive members) 21, 22, 23 and 24 each serving as an image bearing member, developing devices 31, 32, 33 and 34 (each developing an electrostatic latent image into a toner image), and a conveying belt 51. The color image forming apparatus 60 further includes a transferring device for transferring the developed toner image onto a transfer member and a fixing device for fixing the transferred toner image onto the transfer member.

In FIG. 8, respective color signals (code data) of red (R), green (G) and blue (B) are input from an external device 52 such as a personal computer to the color image forming apparatus 60.

The color signals (code data) are converted into pieces of image data (dot data) of cyan (C), magenta (M), yellow (Y) and black (B) by a printer controller 53 in the color image forming apparatus. The respective pieces of image data are input to the optical scanning apparatus 11. Light beams 41, 42, 43 and 44, which are modulated in accordance with the respective pieces of image data, are emitted from the optical scanning apparatus. The photosensitive surfaces of the photosensitive drums 21, 22, and 24 are scanned with the light beams in a main scanning direction.

In the color image forming apparatus 60, light beams corresponding to the respective colors of cyan (C), magenta (M), yellow (Y) and black (B) are emitted from one optical scanning apparatus 11. The optical scanning apparatus 11 records the image signals (image information) on the surfaces of the photosensitive drums 21, 22, 23 and 24, so that a color image is printed at high speed.

As described above, the color image forming apparatus of this embodiment uses the light beams which are respectively based on image data and emitted from the one optical scanning apparatus 11 to form latent images of four colors on the surfaces of the photosensitive drums 21, 22, 23 and 24 respectively corresponding to the four colors. The images are then transferred to a recording material one on another through multilayer transfer to form one full color image.

As the external device 52, a color image reading device including, for example, a CCD sensor is used. In this case, the color image reading device and the color image forming apparatus 60 constitute a color digital copying machine.

Optical Scanning Apparatus (1) Overall Configuration

Figure 1A:
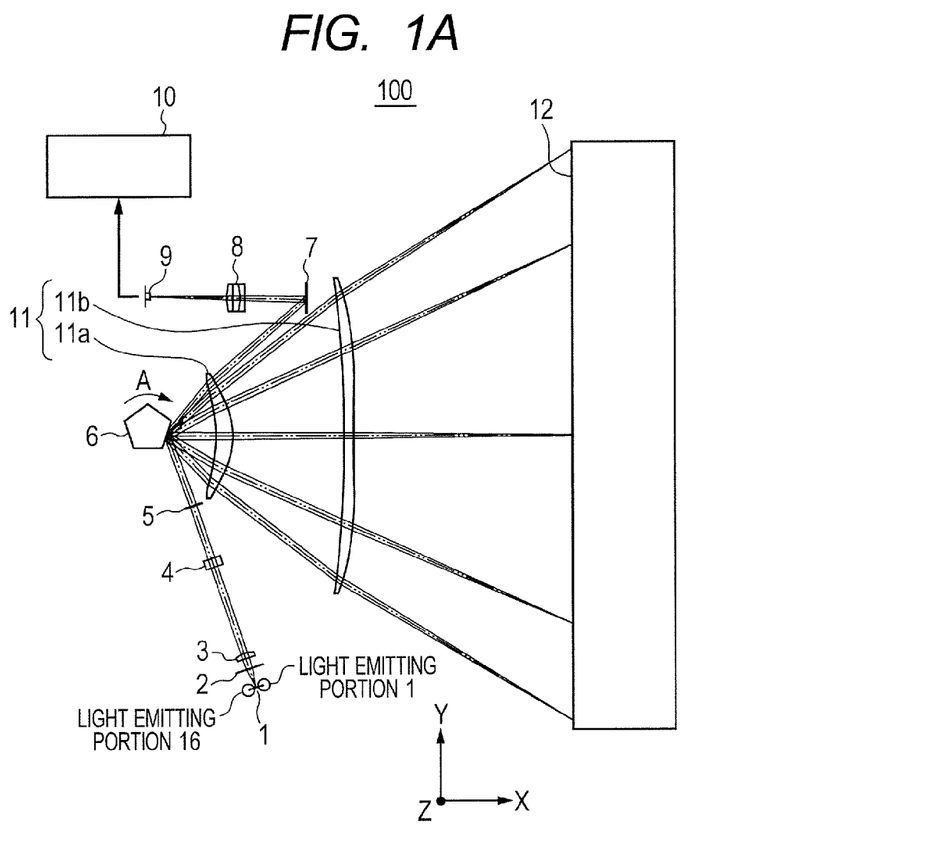
FIG. 1A is a main scanning cross-sectional view of an optical scanning apparatus according to a first embodiment of the present invention.
Figure 2:
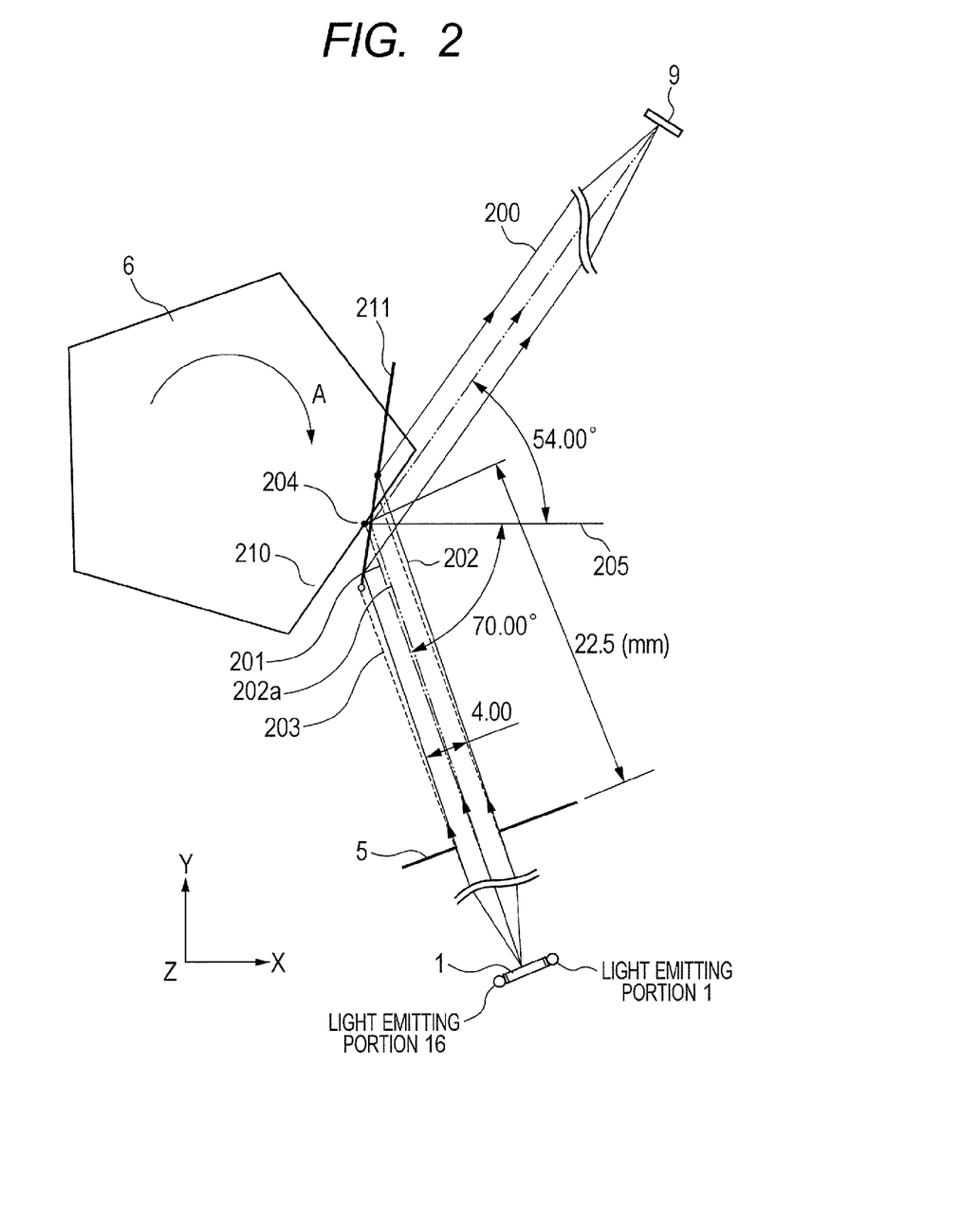
FIG. 2 is an enlarged main scanning cross-sectional view illustrating a vicinity of the deflection surface in the first embodiment.

Hereinafter, an optical scanning apparatus 100 according to a first embodiment of the present invention is described with reference to FIGS. 1A and 2. FIG. 1A is a schematic diagram illustrating main parts of the optical scanning apparatus 100 in an XY cross section (cross section in the main scanning direction). FIG. 2 is an enlarged cross-sectional view of a vicinity of a deflecting device 6 illustrated in FIG. 1A. In this specification, a direction perpendicular to a rotation axis of the deflecting device 6 and an optical axis direction of an imaging optical system 11 (direction in which a light beam is deflected and scanned at the deflecting device) is the main scanning direction, and a direction parallel to the rotation axis of the deflecting device, that is, a direction perpendicular to the main scanning direction and the direction of the optical axis of the imaging optical system 11 is the sub-scanning direction. Further, a plane including the direction of the optical axis of the imaging optical system 11 and the main scanning direction is defined as a main scanning cross section, and a plane orthogonal to the main scanning direction is defined as a sub-scanning cross section.

In FIGS. 1A and 2, a light source 1 includes a semiconductor laser source including 16 light emitting portions (light emitting points). An aperture stop 2 is formed into a rectangular shape, and restricts a light beam width of a light beam emitted from the light source 1 only in the sub-scanning direction. A collimator lens 3 converts the light beam which has passed through the aperture stop 2 into a substantially collimated light beam in both the main scanning direction and the sub-scanning direction. A cylindrical lens 4 has a predetermined refractive power only in the sub-scanning direction. An aperture stop 5 restricts the light beam width in the main scanning direction, and is formed into a rectangular shape having an aperture width wider than the light beam width in the sub-scanning direction.

The elements such as the aperture stops 2 and 5, the collimator lens 3 and the cylindrical lens 4 constitute an incident optical system, and this incident optical system causes the light beam emitted from the plurality of light emitting portions of the light source 1 to enter a deflection surface of the deflecting device 6. In the sub-scanning cross section, substantially a conjugate relationship is established between the deflection surface of the deflecting device or the vicinity thereof and each of the light emitting portions of the light source 1 by the incident optical system.

The deflecting device 6 includes, for example, a polygon mirror (rotary polygon mirror) having a plurality of reflection surfaces that are non-parallel to each other. The plurality of reflection surfaces (deflection surfaces) are rotated at a constant speed in a direction of an arrow A in FIGS. 1A and 2 by a driving unit (not shown) such as a motor, and thus a plurality of light beams emitted from the light source 1 are deflected to scan a surface 12 to be scanned in the main scanning direction.

The imaging optical system 11 includes first and second scanning lenses (fθ lenses) 11a and 11b each having fθ characteristics, and condenses each light beam emitted from each light emitting portion of the light source 1 and deflected for scanning at the deflection surface of the deflecting device 6 on the surface 12 to be scanned. That is, the imaging optical system 11 images each light beam emitted from each light emitting portion on the surface 12 to be scanned. The imaging optical system 11 has an optical face tangle error correction function for the deflecting device by causing the deflection surface of the deflecting device 6 or a vicinity thereof and the surface 12 to be scanned or a vicinity thereof to be in substantially a conjugate relationship in the sub-scanning cross section.

A reflection mirror (BD mirror) 7 reflects a light beam (BD light beam) for synchronization detection to determine a timing of a scanning start position on the surface 12 to be scanned. An imaging lens (BD lens) 8 condenses the BD light beam on a sensor surface of a synchronization detecting element (BD sensor) 9 in both the main scanning cross section and the sub-scanning cross section. The BD lens 8 condenses the substantially collimated light beam on the sensor surface of the synchronization detecting element 9 in the main scanning cross section, and causes the deflection surface of the deflecting device 6 and the sensor surface of the synchronization detecting element 9 to be in substantially an optically conjugate relationship in the sub-scanning cross section. That is, the BD lens 8 serves as an optical face tangle error correction system having the optical face tangle error correction function. With this configuration, even if the deflection surface of the deflecting device 6 is inclined in the sub-scanning direction, the light beam is hardly deviated from the sensor surface of the BD sensor 9.

The BD sensor 9 is an optical sensor, and in the first embodiment, the timing of the scanning start position of an image recording on the surface 12 to be scanned is adjusted by using a synchronization signal (BD signal) obtained by detecting an output signal of the BD sensor 9. Respective elements such as the BD mirror 7, the BD lens 8 and the BD sensor 9 constitute an element of a synchronization detection system (BD detection system). In the first embodiment, a BD slit for restricting a light beam width of the light beam entering the BD sensor 9 is provided in the BD detection system.

(2) Image Recording

In the first embodiment, a size of the cross section of the light beam emitted from the light source 1, which is optically modulated in accordance with image information, is restricted by the aperture stops 2 and 5, and the light beam is converted into a substantially collimated light beam by the collimator lens 3 and enters the cylindrical lens 4. The light beam which has entered the cylindrical lens 4 exits as it is in the main scanning cross section. In the sub-scanning cross section, the light beam is converged and imaged on the deflection surface of the deflecting device 6 as a virtual linear image (linear image elongated in the main scanning direction).

The light beam which has been reflected for deflection at the deflection surface of the deflecting device 6 is condensed on the surface 12 to be scanned in a spot shape by the imaging optical system 11. By rotating the deflecting device 6 in the direction of the arrow A, the surface 12 to be scanned is optically scanned at a constant speed in the main scanning direction. With this configuration, the image recording is performed on the surface 12 to be scanned that serves as a recording medium.

As described in detail later, the writing start timing (scanning start timing) on the surface 12 to be scanned is determined in advance before optically scanning the surface 12 to be scanned by a computation controller 10 that determines the scanning start timing (writing start timing). To this end, the light beam that has been reflected for deflection at the deflecting device 6 is guided to the BD sensor 9 by the BD lens 8 via the BD mirror 7. The computation controller 10 then determines the timing of the scanning start position of the image recording on the surface 12 to be scanned with respect to a light beam emitted from each light emitting portion of the light source 1 by using the synchronization signal (BD signal) obtained by detecting the output signal of the BD sensor 9.

Among the 16 light emitting portions included in the light source 1, only the light emitting portions 1 and 16 arranged on both ends are illustrated in FIG. 2. A dashed-dotted line 201 represents an optical axis of the collimator lens 3, a solid line 202 represents a light beam emitted from the light emitting portion 16, a dashed-two dotted line 202a represents a principal ray (light beam passing through the center of the aperture stop 5) in the light beam emitted from the light emitting portion 16, and a dashed line 203 represents a light beam emitted from the light emitting portion 1. The aperture stop 5, which restricts the light beam width in the main scanning direction, restricts widths of the light beams emitted from the 16 light emitting portions of the light source 1. An on-axial deflection point 204 is an intersect of the optical axis 201 of the collimator lens 3 and an optical axis 205 of the imaging optical system 11. The optical axis 205 of the imaging optical system 11 defines a straight line that is parallel to the light beam heading for the center of an image on the surface 12 to be scanned.

When the deflection surface of the deflecting device 6 is in a state of 210 in FIG. 2, the deflection surface deflects the light beam to the center of the image, and when the deflection surface is in a state of 211, the deflection surface deflects the light beam to the center of the BD slit arranged in front of the BD sensor 9. Further, in the first embodiment, an angle between the principal ray of the light beam emitted from each of the light emitting portions 1 and 16 and the optical axis 201 of the collimator lens 3 is 1 degree. An angle θ between a projection of the principal ray emitted from each of the light emitting portions 1 and 16 with respect to the main scanning cross section and the optical axis 201 can be computed by the following equation from a distance Wm between the light emitting portion 1 and the light emitting portion 16 in the main scanning direction and a focal length $f_{col}$ of the collimator lens 3.

$$\theta = \tan^{-1}\left(\frac{Wm}{2f_{col}}\right)$$

Furthermore, an inclination in an arrangement direction from the light emitting portion 1 to the light emitting portion 16 with respect to the main scanning direction is defined as φ, and the following equation is satisfied.

$$\tan \theta = \tan 1° \cos \phi$$

Figure 1B:
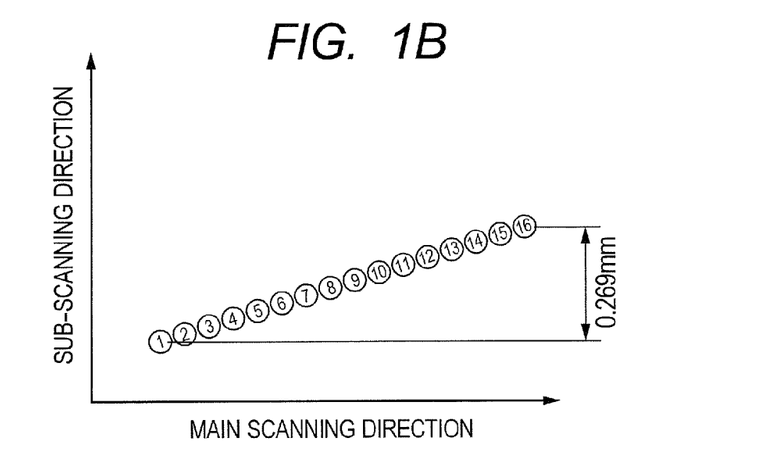
FIG. 1B is a schematic diagram illustrating incident positions of a multibeam on a deflection surface in the first embodiment.

FIG. 1B illustrates incident positions of the light beams emitted from the light emitting portions 1 to 16 included in the light source 1 on the deflection surface of the deflecting device 6, in which the horizontal axis represents the main scanning direction on the deflection surface and the vertical axis represents the sub-scanning direction on the deflection surface. In FIG. 1B, arriving positions of the principal rays of the light beams on the deflection surface are indicated by circles at equal intervals in both the main scanning direction and the sub-scanning direction. Although not shown, images of the light emitting portions 1 to 16 of the light source 1 are formed in the vicinity of the deflection surface as linear images elongated in the main scanning direction. In the first embodiment, the principal ray of the light beam emitted from the light emitting portion 16 is reflected at the deflection surface at a position higher than the light beam emitted from the light emitting portion 1 by 0.269 mm in the sub-scanning direction.

Further, in the main scanning cross section, the light beam emitted from the light emitting portion 16 and the light beam emitted from the light emitting portion 1 have different incident angles from each other with respect to the deflection surface. Therefore, on the surface 12 to be scanned, the light beam emitted from the light emitting portion 1 defines a scanning downstream side (scanning forward side) and the light beam emitted from the light emitting portion 16 defines a scanning upstream side (scanning backward side). In this embodiment, the writing start timing is determined by the light beam emitted from the light emitting portion 16 at the scanning most backward side, which is described later.

When the deflection surface of the deflecting device 6 is rotated in the direction of the arrow A to be in the state of 211, an angle (scanning angle) between a light beam 200 heading for the BD mirror 7 and the optical axis 205 of the imaging optical system 11 becomes 54 degrees, so that the light beam 200 heads for the center of the BD slit. In the first embodiment, the aperture stop 5 is arranged at a position separated from the on-axial deflection point 204 by 22.5 mm in the direction of the optical axis 201.

(3) Specific Configuration of Optical System

Collimator Lens

An exit surface of the collimator lens 3 in the first embodiment is formed into a rotationally symmetric aspherical shape represented by the following equation. By setting the exit surface in an aspherical shape, a difference of focal point between the light beams on the surface 12 to be scanned is reduced, suppressing generation of a spot diameter difference.

$$X = \frac{h^2/R}{1 + \sqrt{1 - (h/R)^2}} + Ah^2 + Bh^4 + Ch^6 + Dh^8 + Eh^{10} + Fh^{12} + Gh^{14}$$

$$h = \sqrt{Y^2 + Z^2}$$

Cylindrical Lens

In the first embodiment, a diffraction surface is formed on an incident surface of the cylindrical lens 4 to suppress a fluctuation of the spot diameter due to an environmental change. A phase function of the diffraction surface is represented by the following equation.

$$\Phi(y, z) = \frac{2\pi}{m\lambda}\{(E_1 y + E_2 y^2 + E_3 y^3 + \ldots + E_{10} y^{10}) + z^2(F_0 + F_1 y + F_2 y^2 + F_3 y^3 + \ldots + F_{10} y^{10})\}$$

where m denotes order of diffraction and $E_1$ to $E_{10}$ and $F_0$ to $F_{10}$ denote phase coefficients. In this equation, $F_0$ to $F_{10}$ are terms representing the power in the sub-scanning direction.

Scanning Optical System

Shapes of the first scanning lens 11a and the second scanning lens 11b constituting the imaging optical system 11 are represented by the following equations, where an intersect of each of the scanning lenses and the optical axis (X axis) is the origin, an axis orthogonal to the X axis in the main scanning direction is Y axis, and an axis orthogonal to the X axis in the sub-scanning direction is Z axis. The shapes are represented separately for the scanning start side (Equation (a)) and the scanning end side (Equation (b)) with respect to the optical axes of the first and second scanning lenses 11a and 11b.

Scanning Start Side $$x = \frac{y^2/R}{1 + \sqrt{1 - (1 + K)(y/R)^2}} + B_{4s} y^4 + B_{6s} y^6 + B_{8s} y^8 + B_{10s} y^{10} \quad (a)$$

Scanning End Side $$x = \frac{y^2/R}{1 + \sqrt{1 - (1 + K)(y/R)^2}} + B_{4e} y^4 + B_{6e} y^6 + B_{8e} y^8 + B_{10e} y^{10} \quad (b)$$

where R denotes the curvature radius, and K, $B_4$, $B_6$, $B_8$ and $B_{10}$ denote aspherical coefficients.

In this embodiment, the shapes of the first and second scanning lenses 11a and 11b in both the main scanning cross section and the sub-scanning cross section are respectively formed symmetrically with respect to the optical axis. In other words, aspherical coefficients on the scanning start side and on the scanning end side are set to be the same. At this time, a curvature in the sub-scanning cross section is continuously changed in the main scanning direction (from the scanning start side to the scanning end side) in an effective area of the lens surface of the second scanning lens 11b.

Regarding the shape in the sub-scanning cross section, a first surface R1 of the first scanning lens 11a (lens surface on the deflecting device 6 side), a second surface R2 of the first scanning lens 11a (lens surface on the surface 12 to be scanned side), and a second surface R4 of the second scanning lens 11b (lens surface on the surface 12 to be scanned side) are represented by the following functions.

$$S = \frac{z^2/r'}{1 + \sqrt{1 - (z/r')^2}}$$

$$r' = r(1 + D_{2s} y^2 + D_{4s} y^4 + D_{6s} y^6 + D_{8s} y^8 + D_{10s} y^{10})$$

$$S = \frac{z^2/r'}{1 + \sqrt{1 - (z/r')^2}}$$

$$r' = r(1 + D_{2e} y^2 + D_{4e} y^4 + D_{6e} y^6 + D_{8e} y^8 + D_{10e} y^{10})$$

where r' denotes the curvature radius in the sub scanning cross section, $D_2$, $D_4$, $D_6$, $D_8$ and $D_{10}$ denote coefficients, the suffix s of the coefficient represents the scanning start side, and the suffix e of the coefficient represents the scanning end side.

The first and second scanning lenses 11a and 11b of this embodiment are each formed of a light transmissive plastic lens having a power. Thus, the scanning lens can be reduced in weight, and flexibility in design can be improved by using an aspherical surface.

In addition, the first and second scanning lenses 11a and 11b may be made of a glass material or may be an optical element having a diffractive power. When a glass material or a diffraction surface is used, it is possible to obtain an optical scanning apparatus superior in environmental responsiveness.

In addition, the scanning optical system includes two scanning lenses in this embodiment, but the present invention is not limited thereto. The same effect as in the embodiment described above may be obtained even when the scanning optical system includes one scanning lens or three or more scanning lenses.

Table 1 shows values of the optical scanning apparatus according to this embodiment. Here, "E-x" means "$10^{-x}$".

TABLE 1

| | |
|---|---|
| Operating wavelength (m) | 6.70E−07 |
| Refractive index of imaging optical system | 1.523972 |
| Number of surfaces of deflecting device | 5 |
| Diameter of circumscribed circle of deflecting device (mm) | 34 |
| Rotation angle of deflecting device (±deg.) | 24 |
| Incident angle in main scanning direction (deg.) | 70 |
| Incident angle in sub-scanning direction (deg.) | 0 |
| On-axial deflection point - Incident surface of first imaging lens (mm) | 2.65E+01 |
| Focal length of imaging lens (mm) | 2.00E+02 |

TABLE 1-continued

| Rotation center coordinates of deflecting device | |
|---|---|
| X | −12.415 |
| Y | −6.247 |

| Incident optical system | | | |
|---|---|---|---|
| | r | d | N (670 nm) |
| Light source (light emitting point) | 0.0000 | 18.7970 | 0.0000 |
| Sub-scanning aperture | | 4.0000 | |
| Collimator lens *1 | 100.0000 | 3.9800 | 1.5796 |
| | −16.6211 | 75.4800 | 0.0000 |
| Cylindrical lens *2 | 0.0000 | 3.0000 | 1.5273 |
| | 7107.68 | 33.0000 | 1.0000 |
| Main scanning aperture | | 22.5000 | |
| Deflection surface | 0.0000 | 0.0000 | 1.0000 |

Scanning optical system

| | | R1 surface | | R2 surface | |
|---|---|---|---|---|---|
| | | Scanning start side (s) | Scanning end side (e) | Scanning start side (s) | Scanning end side (e) |
| Main scanning cross section | d | | 9.60E+00 | d | 6.790E+01 |
| | R | −7.12E+01 | | R | −4.16E+01 |
| | K | 2.18E+00 | K  2.18E+00 | K  6.43E−02 | K  6.43E−02 |
| | B4 | 3.69E−06 | B4  3.69E−06 | B4  2.78E−06 | B4  2.78E−06 |
| | B6 | 8.27E−11 | B6  8.27E−11 | B6  1.18E−09 | B6  1.18E−09 |
| | B8 | 1.96E−13 | B8  1.96E−13 | B8  2.10E−13 | B8  2.10E−13 |
| | B10 | 3.55E−17 | B10  3.55E−17 | B10  2.07E−16 | B10  2.07E−16 |
| Sub-scanning cross section | r | −1.00E+03 | | r  −1.00E+03 | |
| | D2 | 0.00E+00 | D2  0.00E+00 | D2  0.00E+00 | D2  0.00E+00 |
| | D4 | 0.00E+00 | D4  0.00E+00 | D4  0.00E+00 | D4  0.00E+00 |
| | D6 | 0.00E+00 | D6  0.00E+00 | D6  0.00E+00 | D6  0.00E+00 |
| | D8 | 0.00E+00 | D8  0.00E+00 | D8  0.00E+00 | D8  0.00E+00 |
| | D10 | 0.00E+00 | D10  0.00E+00 | D10  0.00E+00 | D10  0.00E+00 |

| | | R3 surface | | R4 surface | |
|---|---|---|---|---|---|
| | | Scanning start side (s) | Scanning end side (e) | Scanning start side (s) | Scanning end side (e) |
| Main scanning cross section | d | | 5.50E+00 | d | 1.27E+02 |
| | R | −8.24E+02 | | R | 7.68E+02 |
| | K | −6.43E−02 | K  0.00E+00 | K  −5.90E+02 | K  −5.90E+02 |
| | B4 | 0.00E+00 | B4  0.00E+00 | B4  −2.57E−07 | B4  −2.57E−07 |
| | B6 | 0.00E+00 | B6  0.00E+00 | B6  2.17E−11 | B6  2.17E−11 |
| | B8 | 0.00E+00 | B8  0.00E+00 | B8  −1.48E−15 | B8  −1.48E−15 |
| | B10 | 0.00E+00 | B10  0.00E+00 | B10  4.78E−20 | B10  4.78E−20 |
| Sub-scanning cross section | r | −1.00E+03 | | r  −2.36E+01 | |
| | D2 | 0.00E+00 | D2  2.45E−06 | D2  7.01E−05 | D2  1.25E−04 |
| | D4 | 0.00E+00 | D4  −1.68E−10 | D4  −1.56E−08 | D4  −1.53E−08 |
| | D6 | 0.00E+00 | D6  0.00E+00 | D6  2.16E−12 | D6  2.83E−12 |
| | D8 | 0.00E+00 | D8  0.00E+00 | D8  −1.69E−16 | D8  −3.04E−16 |
| | D10 | 0.00E+00 | D10  0.00E+00 | D10  5.61E−21 | D10  1.06E−20 |

*1 Aspherical surface
Aspherical coefficient
A  0.00E+00
B  2.30E−05
C  5.84E−08
D  0.00E+00
E  0.00E+00
F  0.00E+00
G  0.00E+00
*2 Phase function
Phase coefficient
F0  −9.10E−03
F1  0.00E+00
F2  0.00E+00
F3  0.00E+00
F4  0.00E+00
F5  0.00E+00
F6  0.00E+00

(4) Writing Start Timing of Each Light Emitting Portion of Light Source (Scanning Start Timing)

As illustrated in FIG. 2, while the light beam 202 from the light emitting portion 16 is not vignetted by the deflection surface (state of 211), the light beam emitted from the light emitting portion 1 is vignetted by the deflection surface (state of 211). Therefore, in the first embodiment, among the light emitting portions 1 to 16 of the light source 1, the light beam emitted from the light emitting portion 16, which does not have a decrease of the light amount due to the scattering at the deflection surface, is used as a BD light beam for a BD detection. Then, based on a BD signal output from the BD detection, the writing start timings (writing start positions) of the light emitting portions 1 to 15 are determined. The BD signal is a signal (BD signal) generated when the light beam emitted from the light emitting portion 16 enters the BD sensor 9.

Figure 1C:
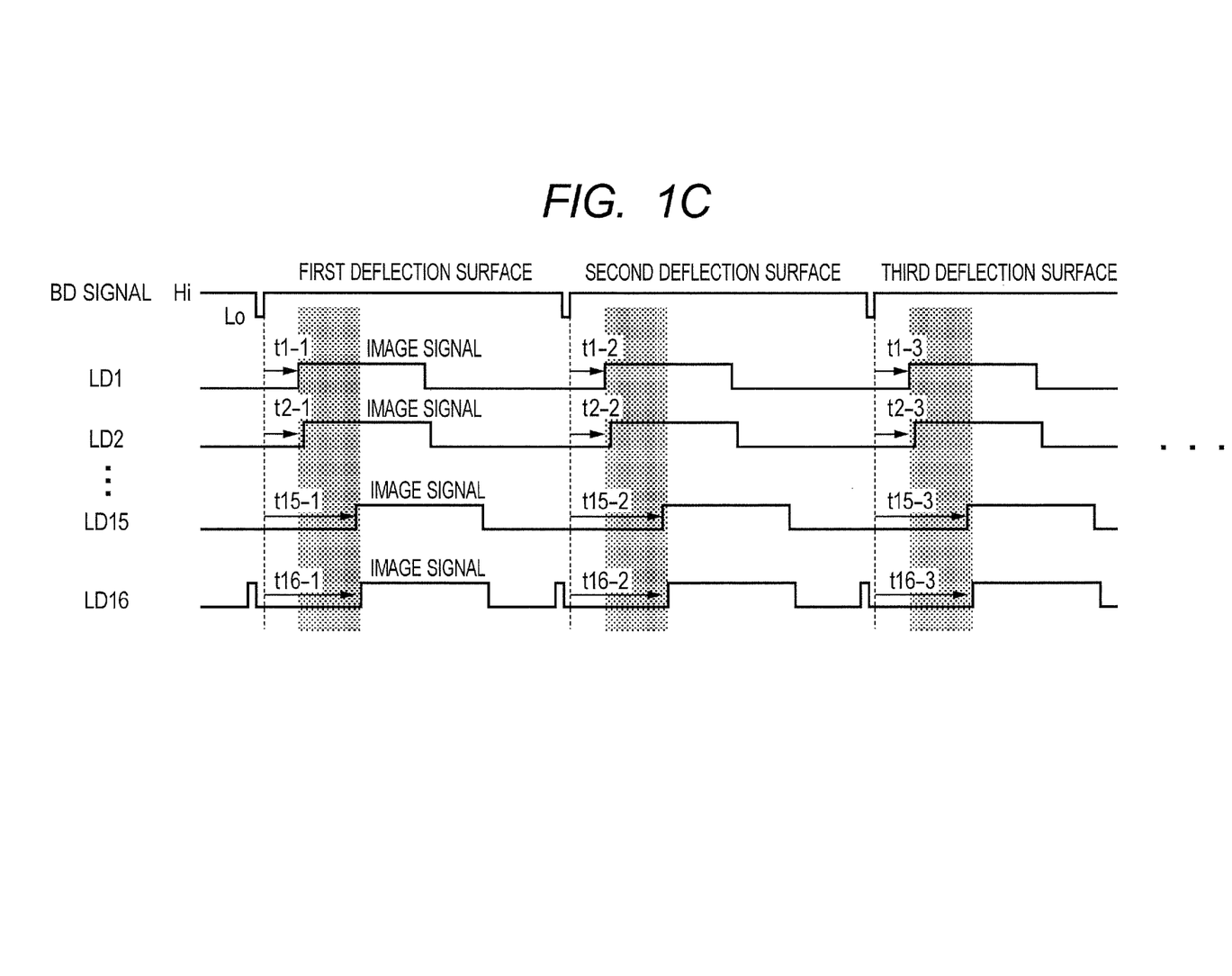
FIG. 1C is a diagram illustrating a writing start timing for each deflection surface in the first embodiment.

FIG. 1C illustrates a relationship between the BD signal and the scanning start timing, for describing the writing start timing of each of the light emitting portions of the light source. In FIG. 1C, a time when the light beam emitted from the light emitting portion 16 (LD 16) deflected at a first deflection surface of the deflecting device 6 crosses the BD slit in the main scanning direction so that the BD signal is changed to a Lo state is set as a reference timing. From this reference timing, an image signal for the light emitting portion 1 (LD 1) is turned ON after t1-1 seconds that is acquired in advance, thus starting writing an image. An image signal for the light emitting portion 2 (LD 2) is turned ON after t2-1 seconds from the reference timing, thus starting writing the image. In the same manner, the wiring timings when the light beams are deflected at the first deflection surface are determined for the light emitting portions 3 to 16.

Also, regarding a case where the light beam deflected at a second deflection surface crosses the BD slit in the main scanning direction, the time when the BD signal is changed to the Lo state is set as the reference timing. From this reference timing, the image signal for the light emitting portion 1 is turned ON after t1-2 seconds that is acquired in advance, thus starting writing an image. The image signal for the light emitting portion 2 is turned ON after t2-2 seconds from the reference timing, thus starting writing the image. In the same manner, the wiring timings when the light beams are deflected at the second deflection surface are determined for the light emitting portions 3 to 16.

Also for a third deflection surface, a fourth deflection surface and a fifth deflection surface, the light beam emitted from each of the light emitting portions starts writing the image after a predetermined time that is acquired in advance since the light beam emitted from the light emitting portion 16 of the light source 1 crosses the BD slit. In this manner, in the first embodiment, the writing start timing is determined separately for all the 16 light emitting portions of the light source 1, and each writing start timing is different for each deflection surface of the deflecting device 6.

Method of Determining Writing Start Timing of Each Beam

In the optical scanning apparatus according to this embodiment, at the time of manufacturing the optical scanning apparatus or before the shipment thereof, a light beam emitted from at least one light emitting portion is detected for each deflection surface of the deflecting device 6, the wiring timings of the light beams emitted from all the light emitting portions of the light source 1 are determined for each deflection surface, and the determined writing start timings are stored in a storage device such as a memory (this is described in detail later). When an image is formed in an image forming apparatus including this optical scanning apparatus, a light beam emitted from at least one light emitting portion is detected for each deflection surface, and the writing start timings of the light beams emitted from all the light emitting portions are determined based on the measurement data stored in the storage device.

Measurement of Writing Start Timing Before Shipment

Figure 3:
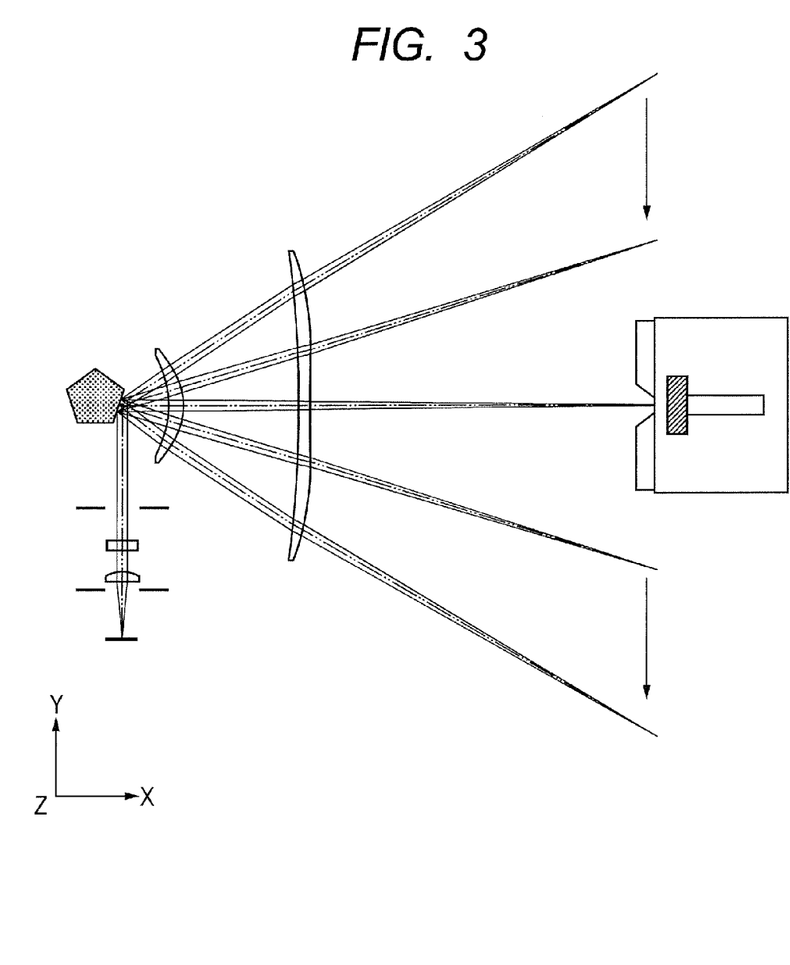
FIG. 3 is a schematic diagram illustrating a configuration for obtaining the writing start timing in advance in the first embodiment.

A method of measuring the writing start timing of the light beam emitted from each of the light emitting portions of the light source 1 is described with reference to FIG. 3. A detection system including a slit (knife-edge) and a photodetector (PD) is arranged at a position corresponding to the surface to be scanned in the vicinity of the optical axis of the imaging optical system in the direction of the optical axis of the imaging optical system. Firstly, the BD signal by the light emitting portion 16 of the light source 1 is detected for each deflection surface by a BD detection system (not shown), and the timing when the BD signal is detected is stored in a memory (not shown) as the reference timing for each deflection surface.

Subsequently, times when light beams emitted from the light emitting portions 1 to 16 and deflected by each deflection surface pass through the slit are measured, and the measured timings are written in the memory. For example, for the first deflection surface, a time from when each light beam is deflected by the first deflection surface to when the light beam passes through the slit based on the reference timing for the first deflection surface is acquired as measurement timings s1-1 to s16-1. In the same manner, measurement timings s1-2 to s16-5 for the second to fifth deflection surfaces are acquired.

Based on the measurement timings s1-1 to s16-5, times (writing start timings) t1-1 to t16-5 to the writing start positions of the image on the surface to be scanned are determined by the computation controller for the light emitting portions 1 to 16, and the determined times t1-1 to t16-5 are stored in the memory. Specifically, the wiring timing t of the light beam of each of the light emitting portions is determined as a value obtained by subtracting a time for each light beam to scan from the writing start position to the center of the image (position of the slit) on the surface to be scanned (i.e., a value obtained by dividing a distance from the writing start position to the center of the image by a scanning speed) from the measurement timing s. That is, each of the writing start timings t1-1 to t16-5 is determined as a delay time until each light beam arrives at the writing start position of the image based on the reference timing for the corresponding deflection surface. The writing start timings t1-1 to t16-5 are not necessarily to be computed by the computation controller according to this embodiment, and values computed by other computation apparatus may be stored in the storage device.

The writing start timing of each of the light emitting portions is deviated from a theoretical value computed from the scanning speed and the beam interval, due to a positional error of each of the light emitting portions, a part manufacturing error such as a wavelength difference of the light source and the surface accuracy of the deflection surface, and an error generated when assembling each part. However, in the first embodiment, the time from the reference timing when the BD signal is detected using the light beam emitted from the light emitting portion 16 to the start of the writing is measured as the writing start timings t1-1 to t16-5 before shipping the optical scanning apparatus from the factory. Therefore, an influence of the above-mentioned errors can be reduced, and the printing position accuracy can be secured in a more accurate manner.

Further, as described above, when determining the writing start timings t1-1 to t16-5, the measurement timings s1-1 to s16-5 are measured by using the measurement system arranged at the center of the image on the surface to be scanned (in the vicinity of the intersect of the imaging optical system and the optical axis). With this configuration, as compared to a case of measuring the measurement timings by arranging the detection system at an end portion of the surface to be scanned, an influence of chromatic difference of magnification of the imaging optical system can be suppressed, and as a result, a printing position misalignment due to a wavelength difference of the beam can be reduced. In addition, although the writing start timings t1-1 to t16-5 are computed and stored in the storage device before factory shipment in the first embodiment, the present invention is not limited to this scheme. That is, the writing start timings t1-1 to t16-5 may be computed based on the measurement timings s1-1 to s16-5 by the computation controller after factory shipment to start forming the image.

Change of Writing Start Timing for Each Deflection Surface

Figure 4A:
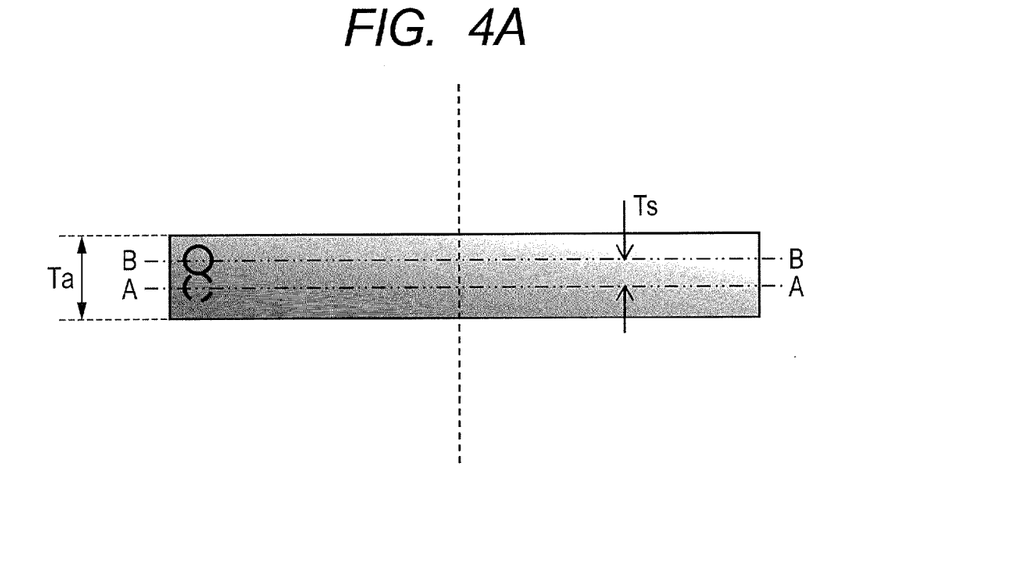
FIG. 4A is a schematic diagram illustrating surface accuracy of the deflection surface.
Figure 4B:
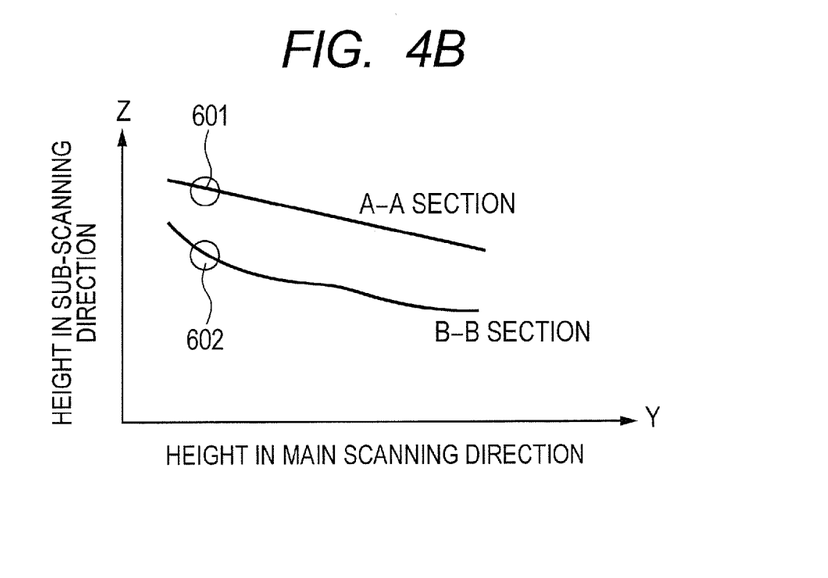
FIG. 4B is a schematic diagram illustrating the surface accuracy of the deflection surface.

As described above, in the first embodiment, the writing start timing of the light beam emitted from each of the light emitting portions is changed for each deflection surface. The reason for this is described with reference to FIGS. 4A, 4B, 5A and 5B. FIGS. 4A and 4B are diagrams illustrating the surface accuracy of the deflection surface of the deflecting device. As illustrated in FIG. 4A, the principal ray of the light beam (beam 1) from the light emitting portion 1 enters the deflection surface of the deflecting device on a straight line connecting A-A, and the principal ray of the light beam (beam 16) from the light emitting portion 16 enters the deflection surface of the deflecting device on a straight line connecting B-B. As illustrated in FIG. 1B, the distance between the beam 1 and the beam 16 in the sub-scanning direction on the deflection surface is 0.269 mm. However, there is a distortion on the actual deflection surface, and hence as illustrated in FIG. 4B, heights of the deflection surface (positions in the sub-scanning direction) on a cross section A-A and a cross section B-B are different for each position in the main scanning direction.

In FIG. 4B, when the beam 1 and the beam 16 enter the deflection surface at the same position in the main scanning direction on, a point 601 at which the principal ray of the beam 1 enters and a point 602 at which the principal ray of the beam 16 enters have different inclinations of the deflection surface. The inclination of the deflection surface indicates that the deflection surface is inclined with respect to the main scanning direction in the main scanning cross section. In the first embodiment, when an interval between the points, at which the beam 1 and the beam 16 enter, in the sub-scanning direction is 0.1 mm, a difference of the inclination of the deflection surface at each point is 0.08 arc-minutes, and hence an influence by the distortion cannot be ignored.

That is, in an optical scanning apparatus employing an inexpensive deflecting device, when the interval between the incident positions of the light beams emitted from the light emitting portions 1 and 16 in the sub-scanning direction on the deflection surface is equal to or larger than 0.1 mm, the difference of the inclination between the incident positions is equal to or larger than 0.05 arc-minutes, and the problem to be solved by the present invention becomes conspicuous. That is, the problem to be solved by the present invention becomes conspicuous when the following condition is satisfied, $$25.4/R \times (M-1)/\beta > 0.1$$

where R (dpi) denotes resolution when the optical scanning apparatus forms an image on the surface to be scanned, M denotes the number of light emitting portions included in the light source, and $\beta$ denotes imaging lateral magnification of the imaging optical system in the sub-scanning cross section. In the first embodiment, R=2,400 dpi, M=16 and $\beta$=1.36 are established, and hence $25.4/R \times (M-1)/\beta = 0.12$ is established. Therefore, the above-mentioned condition is satisfied.

A case where the problem to be solved by the present invention becomes conspicuous can be described as follows. For example, as illustrated in FIG. 4A, the problem to be solved by the present invention becomes conspicuous when the following condition is satisfied, $$0.03 < Ts/Ta < 0.70$$

where Ta denotes a width of the deflection surface in the sub-scanning direction and Ts denotes an interval between the incident positions of the light beams emitted from the light emitting portions 1 and 16 on the deflection surface. Further, the problem to be solved by the present invention becomes more conspicuous when the following condition is satisfied, $$0.04 < Ts/Ta < 0.15.$$

In the first embodiment, the considered cases of a combination of Ta and Ts include a case of Ta=2 mm and Ts=0.1 mm, a case of Ta=1 mm and Ts=0.5 mm, a case of Ta=2 mm and Ts=0.3 mm, and a case of Ta=1.5 mm and Ts=0.2 mm.

Further, the problem to be solved by the present invention becomes conspicuous when the following condition is satisfied, $$10 \cdot Ds/|\beta| < Ts$$

where Ds denotes an interval between two adjacent scanning lines in the sub-scanning direction on the surface to be scanned (lines drawn by two adjacent light emitting portions). The interval Ds can be replaced with a distance in the sub-scanning direction between two spots formed on the surface to be scanned by the light beams emitted from the two light emitting portions adjacent to each other in the sub-scanning direction. In addition, the problem to be solved by the present invention becomes more conspicuous when the following condition is satisfied, $$12 \cdot Ds/|\beta| < Ts < 200 \cdot Ds/|\beta|.$$

The distortion of the deflection surface is often generated when machining the deflection surface or installing a motor. The surface accuracy of the deflection surface varies not only for each deflecting device but also for each deflection surface. The deflection surface of the deflecting device according to this embodiment is machined a plurality of times in the sub-scanning direction (with a pitch of 10 μm to 40 μm) along the main scanning direction by using a cutting tool having a rotated tip. Therefore, so that the distortion of the deflection surface is generated at the machining process. At this time, if the distortion of the deflection surface is to be reduced, the machining time for the deflection surface needs to be prolonged or the machining needs to be performed by using high-precision machining equipment, which increases the manufacturing cost of the deflecting device.

Conventionally, the writing start timing t of the light beam emitted from each of the light emitting portions has been determined based on an average value of the measurement timings s on the plurality of deflection surfaces. That is, in the conventional method, the writing start position of each beam is not changed for each deflection surface, so that the writing start timings are: t1-1=t1-2=t1-3=t1-4=t1-5, t2-1= . . . =t2-5, . . . , and t16-1= . . . =t16-5. If the writing start timing is determined with this method, when there is a change of the inclination for each deflection surface, a deflection angle of each beam is changed for each deflection surface. This causes various problems such as a shift of the writing start position on the surface to be scanned and degradation of the image.

Figure 5A:
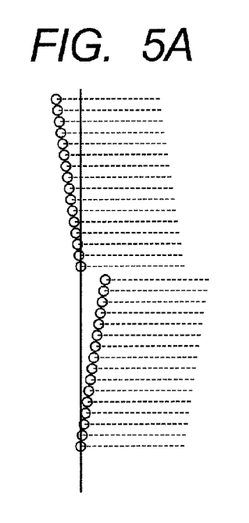
FIG. 5A is a schematic diagram illustrating a beam writing start position on a surface to be scanned.

When the inclination differs depending on the position in the sub-scanning direction within the same deflection surface and when the inclination differs for each deflection surface even at the same position in the sub-scanning direction, if the writing start timing is determined by using the conventional method, the printing position at the writing start timing on the surface to be scanned is shifted as illustrated in FIG. 5A.

Figure 5B:
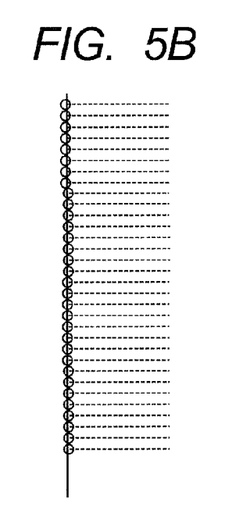
FIG. 5B is a schematic diagram illustrating the beam writing start position on the surface to be scanned.

On the other hand, in this embodiment, the writing start timing by the same beam differs for each deflection surface and the writing start timing of each beam differs on the same deflection surface. With this configuration, as illustrated in FIG. 5B, an influence of the inclination error of the deflection surface can be reduced, and as a result, the printing positions at the writing start timings can be aligned on the surface to be scanned. That is, by causing the writing start timings t1-1 to t16-5 to differ from each other, the influence of the error can be reduced.

Normally, when a periodic writing start position error equal to or larger than 0.5 mm is generated on the surface to be scanned in the sub-scanning direction, the degradation of the image becomes conspicuous. For example, as illustrated in FIG. 5A, when the writing start position is not changed for each deflection surface as in the conventional method, the maximum value of the writing start position error in the main scanning direction ((sub-scanning interval between beam 1 and beam 16 on deflection surface)×(difference of inclination of deflection surface per unit length between deflection surfaces)×(fθ coefficient)) becomes 0.269(mm)×0.08/0.1(arc–minute/mm)×200(mm/rad)×2=0.025 mm. Therefore, in the first embodiment, the writing start timings of all the beams are changed to be different from each other on all the five surfaces, and hence the degradation of the image due to the writing start position error on the surface to be scanned is reduced as illustrated in FIG. 5B.

Identification of Each Deflection Surface

When actually forming an image by the image forming apparatus, the writing of the light beam emitted from each of the light emitting portions is performed by using the writing start timings determined in advance before factory shipment. At this time, it is necessary to identify the deflection surface of the deflecting device and perform the writing by using the writing start timing corresponding to each deflection surface. For this reason, in the first embodiment, each deflection surface is identified based on a BD period between the deflection surfaces. The BD period is a time from the reference timing when the BD detection is performed for a deflection surface (for example, the first deflection surface) to the reference timing when the BD detection is performed for the next deflection surface (for example, the second deflection surface).

Specifically, before factory shipment, a total of five sets of BD periods between adjacent deflection surfaces (first deflection surface-second deflection surface, second deflection surface-third deflection surface, third deflection surface-fourth deflection surface, fourth deflection surface-fifth deflection surface, and fifth deflection surface-first deflection surface) are stored in the memory. When actually forming an image, at the time of starting a motor for driving the deflecting device, the BD period is measured by using an electric circuit (not shown), and by collating the measured BD period with the stored BD period, the deflection surface can be identified.

The above-mentioned identification of the deflection surface is performed by using a fact that all the BD periods, which need to be the same on design, differ from each other due to an error in dividing the deflection surface, a fluctuation of the surface accuracy, and the like. Although values of a part of the five sets of the BD periods may be the same, there is virtually no case where all the five sets of the BD periods are the same. This is causing by an individual difference (an assembling error or a manufacturing error of the deflecting device) is generated when assembling the optical scanning apparatus (or when manufacturing the deflecting device) as well as the distortion of each deflection surface. However, by measuring the value unique to the optical scanning apparatus (all the BD periods or a difference between one reference BD period and another BD period) and storing the measured value in the memory, it is possible to identify all the deflection surfaces.

In the first embodiment, the BD period between the deflection surfaces is measured in advance and stored in the storage device such as a memory. However, the BD period may be measured at the time of starting the image forming apparatus and the measured value may be stored in the memory. In addition, the BD period may be measured again at the time of readjustment after shipment and the measured value may be stored in the memory or an operator may directly change contents stored in the memory as appropriate.

As described above, in the optical scanning apparatus according to the first embodiment, the writing start timing of each of the light emitting portions for each deflection surface and the BD period between the deflection surfaces are stored in the storage device such as a memory. When actually forming an image, at the time of scanning the light beam emitted from each of the light emitting portions and modulated based on image data, the writing start position of each light beam is controlled by using the stored writing start timing and BD period.

Specifically, the BD light beam emitted from the light emitting portion 16 is detected first by the BD sensor, and the reference timing at a given deflection surface (timing at which the deflection surface is switched) is detected by the synchronization signal (BD signal) output from the BD sensor (or obtained by computation using the detection result).

Subsequently, based on the detected reference timing and the BD period stored in the memory (by obtaining a sum of those values or adding an adjustment value to the sum), the reference timing for other deflection surfaces is determined. After that, by controlling the timing for starting modulation of each light beam emitted from the light source in accordance with the image data based on the writing start timing of each of the light emitting portions for each deflection surface stored in the memory, a desired image can be formed on the surface to be scanned.

In the optical scanning apparatus according to the first embodiment, the writing start timing is changed for each deflection surface of the deflecting device or for each switch of the deflection surface (for each combination of the deflection surface before switching and the deflection surface after switching). In other words, a difference of the scanning start timing (writing start timing) of the plurality of light beams between two adjacent deflection surfaces among the plurality of deflection surfaces is different from a difference of the scanning start timing (writing start timing) between other two adjacent deflection surfaces. That is, a timing for starting the modulation of the light beam emitted from each of the light emitting portions is determined by the computation controller 10 so that the two differences of the writing start timing differ from each other with respect to each light beam. At this time, the computation controller 10 controls the light source for each deflection surface based on the writing start timings stored in the storage device in advance.

Although the BD lens is provided in the BD detection system in the first embodiment, a portion of the scanning lens may be used for the synchronization detection instead of providing the BD lens. In addition, the optical scanning apparatus according to the first embodiment achieves high-speed scanning by employing a monolithic multibeam laser including the 16 light emitting portions as the light source. Further, by acquiring the BD signal by detecting the light beam emitted from one light emitting portion and measuring the writing start timing of each light beam for each deflection surface based on the acquired BD signal, 16×5=80 writing start timings are stored in the storage device.

As described above, with the optical scanning apparatus according to the first embodiment, it is possible to reduce degradation of the image quality (in particular, the degradation of the image quality at an end portion of the image in the main scanning direction) due to a shift of the writing start timing for each deflection surface caused by the surface accuracy error of each deflection surface and the like. With this configuration, even when an inexpensive deflecting device is used, an optical scanning apparatus that can form a high-resolution image can be provided. In addition, when the optical scanning apparatus according to the first embodiment is applied to a color image forming apparatus, an inexpensive high-resolution color image forming apparatus with less color misregistration can be provided.

Second Embodiment

A second embodiment of the present invention is different from the first embodiment in a method of determining writing start timings t1-1 to t16-5. The other configurations are the same as those of the first embodiment. In the second embodiment, before factory shipment, only the writing start timings of the light beams emitted from the light emitting portions 1 and 16 that are most separated in the sub-scanning direction are measured for each deflection surface, and the measured values are stored in the storage device. That is, only a total of 10 writing start timings t1-1 and t16-1, t1-2 and t16-2, . . . , and t1-5 and t16-5 are measured. At this time, the writing start timings t2-1 to t15-1 are computed by the computation controller by linear interpolation of the writing start timings t1-1 and t16-1 stored in the storage device, and the computed values are stored in the storage device.

In the same manner, the other writing start timings t2-2 to t15-2, . . . , and t2-5 to t15-5 are acquired by the linear interpolation of the t1-2 and t16-2, . . . , and t1-5 and t16-5, respectively. In this manner, by measuring only the writing start timings of (2 beams)×(5 surfaces)=10 beams and computing the writing start timings of (the other beams)×(5 surfaces)=70 beams by interpolation (for example, linear interpolation), the writing start timings of all the beams can be acquired for each deflection surface in advance. With this configuration, the capacity of the memory as the storage device can be saved, and the time required for measuring the writing start timings can be reduced to one eighth of the time in the first embodiment, and therefore, a more inexpensive optical scanning apparatus can be provided.

Further, although the writing start timings for five surfaces of only two beams most separated in the sub-scanning direction on the deflection surface (on both sides) are measured in the second embodiment, three beams on the both sides and near the center may be used to measure the writing start timings of (3 beams)×(5 surfaces)=15 beams. In this case, the influence of the surface accuracy error of the deflection surface can be further reduced, and as a result, the printing position accuracy in the main scanning direction can be improved.

As described above, by measuring the writing start timings of only the beams most separated in the sub-scanning direction on the deflection surface for each deflection surface and obtaining the writing start timings of the rest of unmeasured beams by the interpolation, a high-resolution optical scanning apparatus that achieves both the suppression of the degradation of the image quality caused by the surface accuracy error of the deflection surface and the low cost can be provided. In addition, when the optical scanning apparatus according to the second embodiment is applied to a color image forming apparatus, an inexpensive high-resolution color image forming apparatus with less color misregistration can be provided.

Third Embodiment

A third embodiment of the present invention is different from the first embodiment in that a monolithic 36 beam laser (VCSEL) of a two-dimensional array is used as the light source. The other configurations are the same as those of the first embodiment. The surface accuracy of each deflection surface of the deflecting device according to the third embodiment is set so that a difference of the inclination between positions separated by 0.1 mm in the sub-scanning direction within the surface is 0.05 arc–minutes.

Figure 6:
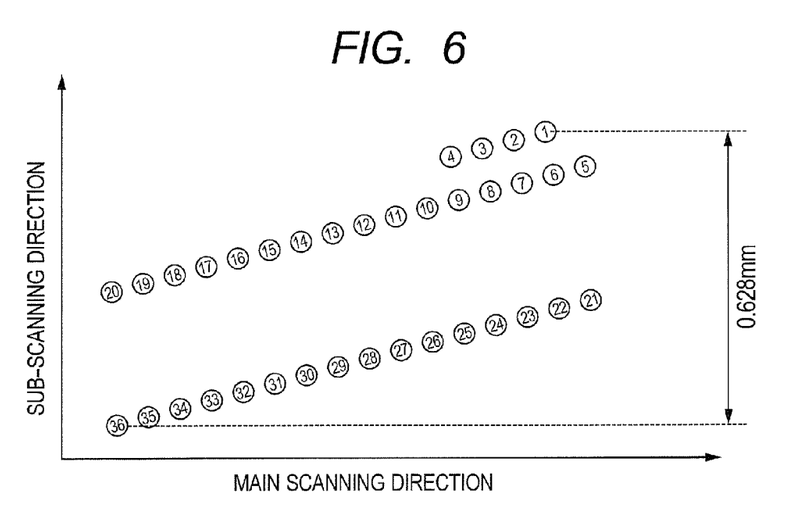
FIG. 6 is a schematic diagram illustrating incident positions of a multibeam on a surface of a deflection surface according to a third embodiment of the present invention.

Beams on the deflection surface according to the third embodiment is described below with reference to FIG. 6. In FIG. 6, the horizontal axis represents the position in the main scanning direction on the deflection surface, and the vertical axis represents the position in the sub-scanning direction thereon. Although not shown, the light emitting portions 1 to 36 of the light source 1 are imaged as linear images elongated in the main scanning direction in the vicinity of the deflection surface. In FIG. 6, arriving positions of the principal rays of the light beams on the deflection surface are indicated by circles at equal intervals in the sub-scanning direction in a two-dimensional array. In the third embodiment, the principal ray of the light beam emitted from the light emitting portion 1 is reflected at the deflection surface of the deflecting device 6 at a position higher than the light beam emitted from the light emitting portion 36 by 0.628 mm in the sub-scanning direction.

In the third embodiment, the writing start timings of the beams 1 to 36 are determined based on the BD signal obtained when the beams 36 and 20 that are not vignetted by the deflection surface are simultaneously emitted. This is because by performing the BD detection by using the two beams 36 and 20 that substantially match each other in the main scanning direction, it is easy to secure the light amount in the BD detection system, and therefore, the detection accuracy is improved.

Figure 7:
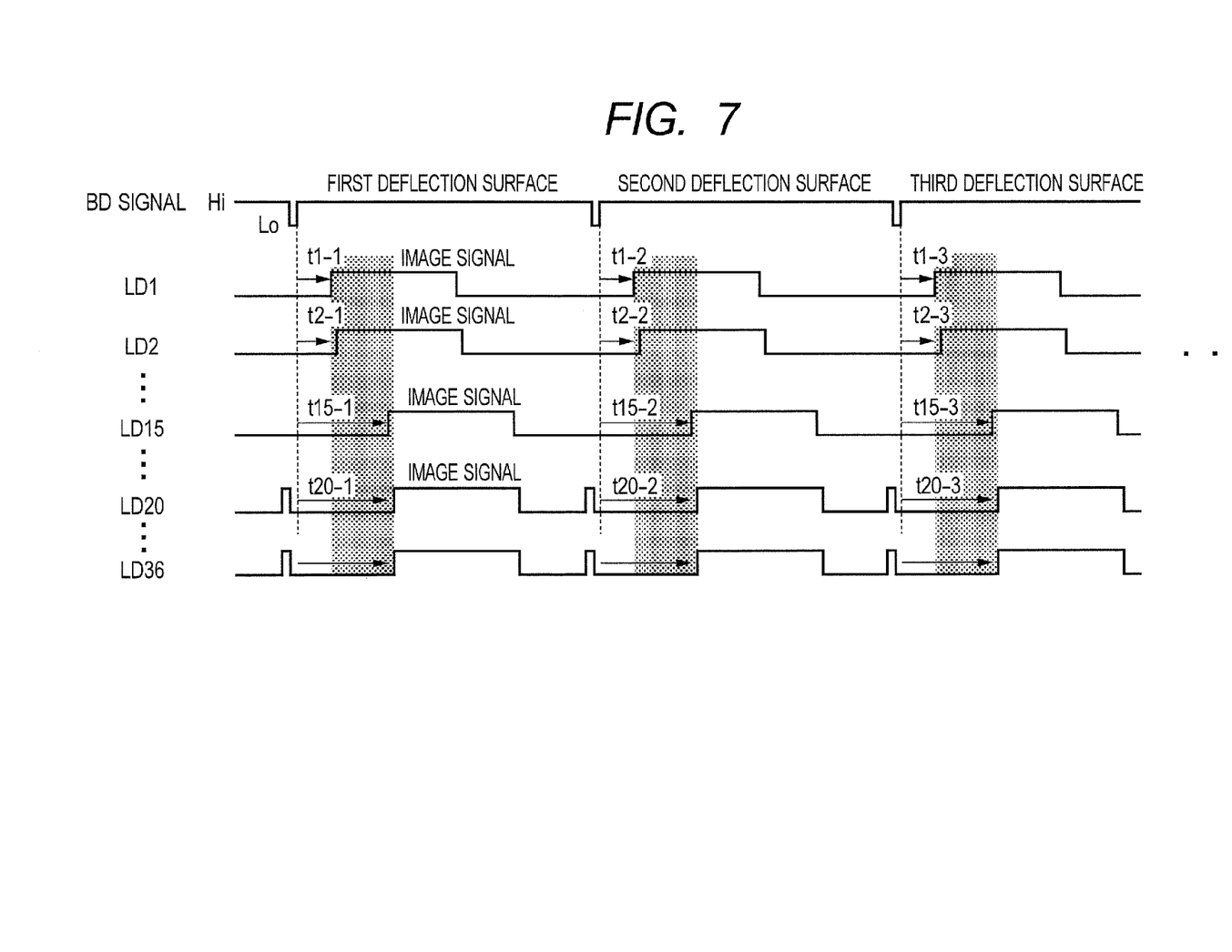
FIG. 7 is a diagram illustrating a writing start timing for each deflection surface in the third embodiment.

FIG. 7 illustrates a relationship between the BD signal and the scanning start timing according to the third embodiment. In FIG. 7, a time when the light beams emitted from the light emitting portion 20 (LD 20) and the light emitting portion 36 (LD 36) cross the BD slit in the main scanning direction virtually at the same time so that the BD signal is changed to a Lo state is set as a reference timing. Then, regarding the beam emitted from the light emitting portion 1 (LD 1) deflected at the first deflection surface, an image signal is turned ON after t1-1 seconds acquired in advance from the reference timing, thus starting writing the image.

An image signal of the beam emitted from the light emitting portion 2 (LD 2) is turned ON after t2-1 seconds from the reference timing, thus writing the image. In the same manner, regarding the beams emitted from the other light emitting portions 3 to 36, writing start of the image is performed after t3-1 seconds to t36-1 seconds, respectively. In the third embodiment, because the light source 1 includes the 36 light emitting portions, a low-output laser with a small light emission is used in each of the light emitting portions. Therefore, in order to prevent the detection accuracy from being degraded due to the small light amount of one beam entering the BD sensor, as described above, the two light emitting portions 36 and 20 located at substantially the same position in the main scanning direction are simultaneously turned ON, so that the light amount on the BD sensor is secured to perform the BD detection.

In this manner, the optical scanning apparatus according to the third embodiment achieves higher-speed scanning by employing the monolithic multibeam laser (VCSEL) of the two-dimensional array including the 36 light emitting portions as the light source. In the third embodiment as well, in the same manner as the first embodiment, the writing start timings of the light beams emitted from the light emitting portions differ from each other for each deflection surface.

In the conventional method in which the writing start timing is not changed for each deflection surface, the maximum value of the writing start position error in the main scanning direction ((interval between beams most separated in sub-scanning direction on deflection surface (beams 1 and 36))× (difference of inclination of deflection surface per unit length between deflection surfaces)×(fθ coefficient)) becomes as follows. That is, the maximum value of the writing start position error in the main scanning direction becomes 0.628 (mm)×0.05/0.1(arc−minute/mm)×200(mm/rad)×2=0.036 mm, thus causing a shift corresponding to three pixels or more in the resolution of 2,400 dpi of the third embodiment. Normally, the shift of the writing start position in the main scanning direction needs to be suppressed to one pixel or less, and therefore, it is found that an intolerable position shift is generated in the conventional method of determining the writing start timing.

As described above, with the optical scanning apparatus according to the third embodiment, by employing a VCSEL light source including a plurality of light emitting portions arranged in a two-dimensional array, the writing start timing for each of the light emitting portions is changed for each deflection surface. With this configuration, even when an inexpensive deflecting device is used, the degradation of the image due to the surface accuracy error for each deflection surface can be reduced, and as a result, an optical scanning apparatus that can form a high-resolution image can be provided. In addition, when the optical scanning apparatus according to the third embodiment is applied to a color image forming apparatus, a high-resolution color image forming apparatus that has less color misregistration can be provided.

Modified Embodiments

The exemplary embodiments of the present invention have been described above. However, the present invention is not limited thereto these exemplary embodiments, and various modifications and changes can be made thereto within the gist of the present invention. For example, in the above-mentioned embodiments, the writing start timings of all the light emitting portions of the light source are measured before shipment or the writing start timings of the light emitting portions on both sides that are most separated in the sub-scanning direction are measured. However, it is also possible to measure only the writing start timings of the light beams emitted from the light emitting portions alternately arranged in the sub-scanning direction among the plurality of light emitting portions and determine the writing start timings of the other light emitting portions by interpolation (for example, linear interpolation).

Further, when the difference of inclination between the positions separated from each other by 0.1 mm in the sub-scanning direction within the surface of each deflection surface is equal to or larger than 0.05 arc−minutes, it is preferred that the number of pieces of data of the writing start timing measured and stored in the storage device before shipment be settable in accordance with the difference of inclination. That is, it is more preferred that the number of pieces of measurement data before shipment be increased when the difference of inclination is large.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-023039, filed Feb. 6, 2012, which is hereby incorporated by reference herein in its entirety.

What is claimed is:

1. An optical scanning apparatus comprising:
a light source unit having a first light emitting portion and a second light emitting portion;
a deflector having a first deflection surface and a second deflection surface that is adjacent to the first deflection surface, each configured to deflect a first light beam emitted from the first light emitting portion and a second light beam emitted from the second light emitting portion in a main scanning direction;
an imaging optical system configured to guide the deflected first and second light beams to a surface to be scanned; and
a controller configured to control the light source unit so that a difference between a writing start timing of the first light beam deflected by the first deflection surface and a write timing of the second light beam deflected by the first deflection surface is always different from a difference between a writing start timing of the first light beam deflected by the second deflection surface and the second light beam deflected by the second deflection surface,
wherein the first light emitting portion and the second light emitting portion are spaced from each other along a sub-scanning direction, which is perpendicular to the main scanning direction and an optical axis direction of the imaging optical system.

2. An optical scanning apparatus according to claim 1, wherein the controller is configured to control the light source unit so that each of the start timings of the first light beam and the second light beam deflected by each of the first deflection surface and the second deflection surface differs from each other.

3. An optical scanning apparatus according to claim 1, further comprising a detection unit configured to detect at least one of the first or second light beam deflected by the first deflection surface and the second deflection surface and generate a synchronization signal for each of the first deflection surface and the second deflection surface.

4. An optical scanning apparatus according to claim 3, wherein the controller control the light source unit on the basis of the writing start timings of the first light beam and the second light beam for each of the first deflection surface and the second deflection surface, and the synchronization signal for the each of the first deflection surface and the second deflection surface.

5. An optical scanning apparatus according to claim 1, wherein the following condition is satisfied:

$$0.03 < Ts/Ta < 0.70,$$

where Ts denotes an interval in the sub-scanning direction between an incident position of the first light beam and an incident position of the second light beam on each of the first and second deflection surfaces, and Ta denotes a width in the sub-scanning direction of each of the first and second deflection surfaces.

6. An optical scanning apparatus according to claim 1, wherein the following condition is satisfied:

$$25.4/R \times (M-1)/\beta > 0.1,$$

where R denotes a resolution in dpi when the optical scanning apparatus forms an image on the surface to be scanned, M denotes a number of light emitting portions included in the light source, and $\beta$ denotes an imaging lateral magnification of the imaging optical system in a cross section orthogonal to the main scanning direction.

7. An optical scanning apparatus according to claim 1, wherein a difference of inclination between positions separated from each other by 0.1 mm in the sub-scanning direction of each of the first and second deflection surfaces is equal to or larger than 0.05 arc-minutes in a cross section orthogonal to the sub-scanning direction.

8. An optical scanning apparatus according to claim 7, wherein a number of pieces of data of writhing start timing obtained in advance for the each of the first deflection surface and the second deflection surface is set in accordance with the difference of inclination.

9. An optical scanning apparatus according to claim 1, wherein the controller controls the light source unit in accordance with inclinations of positions at which the first light beams and the second light beams are incident on each of the first deflection surface and the second deflection surface in a cross section orthogonal to the sub-scanning direction.

10. An optical scanning apparatus according to claim 1, wherein the light source unit has a plurality of light emitting portions including the first light emitting portion and the second light emitting portion.

11. An optical scanning apparatus according to claim 10, wherein the controller determines a writing start timing of a light beam from another light emitting portion on the basis of the writing start timing of the first light beam and the second light beam.

12. An optical scanning apparatus according to claim 10, wherein the first light emitting portion and the second light emitting portion are most separated in the sub-scanning direction among the plurality of light emitting portions.

13. An optical scanning apparatus according to claim 10, wherein another light emitting portion is arranged between the first light emitting portion and the second light emitting portion.

14. An optical scanning apparatus according to claim 10, wherein the writing star timing of the second light beam is latest among the plurality of light beams emitted from the plurality of light emitting portions.

15. An image forming apparatus comprising:
an optical scanning apparatus including:
  a light source unit having a first light emitting portion and a second light emitting portion;
  a deflector having a first deflection surface and a second deflection surface that is adjacent to the first deflection surface, each configured to deflect a first light beam emitted from the first light emitting portion and a second light beam emitted from the second light emitting portion in a main scanning direction;
  an imaging optical system configured to guide the deflected first and second light beams to a surface to be scanned; and
  a controller configured to control the light source unit so that a difference between a writing start timing of the first light beam deflected by the first deflection surface and a write timing of the second light beam deflected by the first deflection surface is always different from a difference between a writing start timing of the first light beam deflected by the second deflection surface and the second light beam deflected by the second deflection surface,
  wherein the first light emitting portion and the second light emitting portion are spaced from each other along a sub-scanning direction, which is perpendicular to the main scanning direction and an optical axis direction of the imaging optical system;
a developer configured to develop an electrostatic latent image into a toner image, the electrostatic latent image being formed on a photosensitive member arranged on the surface to be scanned by the optical scanning apparatus;
a transferring device configured to transfer the developed toner image onto a transfer member; and
a fixing device configured to fix the transferred toner image onto the transfer member.

* * * * *